United States Patent [19]

Allen et al.

[11] Patent Number: 4,786,692

[45] Date of Patent: Nov. 22, 1988

[54] HIGH STRENGTH, REDUCED HEAT DISTORTION TEMPERATURE THERMOPLASTIC COMPOSITION

[75] Inventors: Deborah L. Allen; Richard B. Allen, both of Dalton; Robert A. Wiercinski, Cambridge, all of Mass.

[73] Assignee: General Electric Company, Pittsfield, Mass.

[21] Appl. No.: 843,776

[22] Filed: Mar. 25, 1986

Related U.S. Application Data

[63] Continuation of Ser. No. 451,186, Dec. 20, 1982, abandoned.

[51] Int. Cl.$^4$ .................. C08L 67/02; C08L 69/00
[52] U.S. Cl. .................. 525/439; 525/148; 525/92; 524/537
[58] Field of Search ............................. 525/439

[56] References Cited

U.S. PATENT DOCUMENTS

| | | | |
|---|---|---|---|
| 4,188,314 | 2/1980 | Fox | 525/433 |
| 4,267,096 | 5/1981 | Bussink | 525/67 |
| 4,352,907 | 10/1982 | Lee | 524/537 |

OTHER PUBLICATIONS

Research Disclosure, May 1983, pp. 182–183.

*Primary Examiner*—Patricia Short
*Attorney, Agent, or Firm*—Hedman, Gibson, Costigan & Hoare

[57] ABSTRACT

New and improved thermoplastic compositions are disclosed comprising a blend of an aromatic polycarbonate and a copolymer derived from a glycol portion comprising 1,4-cyclohexanedimethanol and ethylene glycol present in molar ratios of 1:4 to 4:1 respectively and an acid portion comprising an aromatic dicarboxylic acid selected from terephthalic acid, isophthalic acid, and mixtures thereof. The compositions are compatible with, and advantageously contain impact modifiers and flame retardants. The copolymer of the subject invention has a heat distortion temperature of from 60° C. to 70° C. and when incorporated in the thermoplastic compositions of this invention provides polycarbonate-based compositions which exhibit lower heat distortion temperatures while retaining good tensile, flexural and impact strengths.

The lower heat distortion temperatures of the compositions permits them to be molded and processed at lower temperatures thereby avoiding the degradation of the materials with concomitant loss in impact strength observed with higher conventional molding temperatures employed with earlier compositions.

5 Claims, No Drawings

HIGH STRENGTH, REDUCED HEAT DISTORTION TEMPERATURE THERMOPLASTIC COMPOSITION

This application is a continuation of application Ser. No. 451,186, filed Dec. 20, 1982, now abandoned.

BACKGROUND OF THE INVENTION

The subject invention relates to thermoplastic polycarbonate/polyester compositions having low heat distortion temperatures which are characterized by high tensile and flexural strength and good impact strength. More particularly, the subject invention relates to thermoplastic compositions comprising an aromatic carbonate polymer and a polyester copolymer derived from a glycol portion comprising 1,4-cyclohexanedimethanol and ethylene glycol present in molar ratios of 1:4 to 4:1 respectively and an acid portion comprising at least one aromatic dicarboxylic acid selected from terephthalic acid, isophthalic acid and mixtures of the two.

Aromatic carbonate polymers are a well known and available family of materials which enjoy a variety of applications in the field of plastics. These polymers can be prepared by a number of procedures. In one way, the polymer is produced by reacting a dihydric phenol, e.g., 2,2-bis(4-hydroxyphenyl)propane, with a carbonate precursor, e.g., phosgene, in the presence of an acid binding agent.

In general, aromatic polycarbonate resins can be molded or otherwise shaped into articles which possess highly desirable chemical and physical properties, including resistance to attack by mineral acids, resistance to staining, high impact strength in thin walled sections and good dimensional stability. Polycarbonates are known to be admixable with various polyesters, including poly(alkylene terephthalates).

More particularly, it is known to blend polyesters with polycarbonates to provide thermoplastic compositions having improved properties over those based upon either of the single resins alone. Moreover, such blends are often more cost effective than polycarbonate alone.

Poly(ethylene terephthalate) and poly(1,4-butylene terephthalate) have been widely used to form polyester-polycarbonate blends. For example, compositions of polycarbonate resins and polyester are disclosed by Nakamura et al. in U.S. Pat. No. 3,864,428.

Cohen et al., U.S. Pat. No. 4,257,937, describe thermoplastic molding compositions of poly(1,4-butylene terephthalate), optionally also containing poly(ethylene terephthalate), and a modifier composed of a combination of a polyacrylate resin and an aromatic polycarbonate. The compositions can also include fillers and/or reinforcements and flame retardant additives.

Fromuth et al., U.S. Pat. No. 4,264,487, disclose compositions based on aromatic polyesters such as polymeric resins of $C_2$ to $C_8$ alkylene terephthalates, which contain synergistic amounts of acrylate-based core-shell polymer and aromatic polycarbonate. The compositions are described as having high impact strength and an increased heat deflection temperature.

Still other modified polyester compositions are described elsewhere in the patent literature. Dieck et al. in U.S. Pat. No. 4,220,735 indicate that a polyblend composed of poly(1,4-butylene terephthalate) resin and poly(ethylene terephthalate) resin can be modified for greater impact strength by including effective amounts of a selectively hydrogenated monoalkenyl arene-diene block copolymer, for example, polystyrene-polybutadiene-polystyrene, together with an aromatic polycarbonate resin.

Gergen et al. in U.S. Pat. No. 4,111,895 disclose multi-component polymer blends comprised of polycarbonate, a selectively hydrogenated monoalkenyl arene-diene block copolymer and at least one dissimilar engineering thermoplastic, for example, thermoplastic polyesters. The components are admixed under conditions such that at least two of the polymers form continuous network phases which interlock with other polymer networks to produce a desirable balance of properties.

Bussink et al. in U.S. Pat. No. 4,267,096 teach that the use of a selectively hydrogenated elastomeric block copolymer together with an amorphous polyester improves the melt flow characteristics, resistance to brittle failure and resistance to environmental stress cracking of polycarbonate resin.

Japanese laid open patent application No. 044,373 describes thermoplastic molding compositions of polyester resin, e.g., poly(ethylene terephthalate), polycarbonate resin and minor amounts of a third resin obtained by polymerizing a shell comprising aromatic hydrocarbon and, optionally, methacrylate or similar monomer onto a rubbery acrylic core. The composition of these ingredients is said to have excellent moldability, mechanical and thermal properties.

A disadvantage associated with use of poly(alkylene terephthalate) is its relatively low notched impact strength, which this carries over into blends of the polyester with aromatic polycarbonates. It has been proposed that the notched impact strength of poly(alkylene terephthalates) can be improved upon by admixture with an impact modifier system composed of an aromatic polycarbonate and acrylate based polymer. Compositions of this type are disclosed in U.S. Pat. Nos. 4,257,937 (Cohen, et al.), 4,264,487 (Fromuth, et al.,) and the above-mentioned Japanese patent publication.

More recently, certain amorphous copolyesters, i.e., those having a low degree of crystallinity, have been developed. In U.S. Pat. No. 2,901,466 to Kibler et al., substantially amorphous polymeric linear polyesters and polyesteramides are described which are the condensation product of (1) either the cis or the trans isomer or a mixture of these isomers of 1,4-cyclohexanedimethanol alone or mixed with another bifunctional reactant, with (2) a bifunctional carboxy compound. The broad range of polymers defined therein include linear polyester polymers which have melting points as low as about 100° C. and the polyesters melting below about 200° C. are described as primarily useful for the preparation of molding compositions.

It has elsewhere more recently been disclosed that amorphous copolyesters having a low degree of crystallinity may be utilized in polycarbonate blends to provide improvements in impact strength and transparency, processability, solvent resistance and environmental stress cracking resistance.

More particularly, as disclosed in U.S. Pat. No. 4,188,314, assigned to the same assignee as the present invention, a composition useful for forming shaped articles characterized by enhanced solvent resistance and good physical properties comprises an aromatic carbonate polymer and a polyester polymer derived from cyclohexanedimethanol and a mixture of terephthalic acid and isophthalic acid. Articles shaped from these compositions are described as having higher dimensional stability than articles derived from cyclohexanedimethanol and a single acid, e.g., either terephthalic or isophthalic acid alone. In addition, the compositions are said to have lower vacuum forming temperatures thereby permitting sheets of the material to be vacuum formed or thermally shaped into shields or signs without the normally required time-consuming step of pre-drying the sheet. Finally, it is disclosed that the compositions can accept relatively larger amounts of UV stabilizers without the usual deleterious effect on impact strength which is associated with polycarbonate compositions containing similar concentrations of stabilizers which tend to degrade and become brittle.

Another thermoplastic resin blend incorporating a polycarbonate and an amorphous polyester is disclosed in U.S. Pat. No. 4,267,096, said patent also being assigned to the same assignee as the present invention. As described therein, useful compositions having improved processability and extrusion characteristics comprise: (A) from about 0.1 to about 6 parts by weight of a selectively hydrogenated linear, sequential or radial teleblock copolymer of a vinyl aromatic compound A and A' an olefinic elastomer (B) of the A—B—A'; A—(-BAB)$_n$—A; A(BA)$_n$B; A$_4$B; A(B)$_4$; or B[(AB)$_4$ type, wherein n is an integer of from 1 to 10; (B) from about 65 to about 97.5 parts by weight of an aromatic polycarbonate resin; and (c) about 1 to about 30 parts by weight of an essentially amorphous polyester resin. The amorphous polyester resin component (c) is described as the reaction product of a $C_2$-$C_{10}$ alkylene glycol and an aromatic dicarboxylic acid e.g., terephthalic or isophthalic acid. The use of copolyesters of poly(alkylene terephthalate) type is preferred. More particularly, it is preferred to use copolyesters of from 99.5% to 94% by weight of poly(alkylene terephthalate) which contain, incorporated at random in the chain small amounts of from 0.5 to 5% by weight of dissimilar units in order to break down any tendency whatever for the "100%" pure polyester to crystallize. Alternatively, the use of a small amount of isophthalic acid instead of terephthalic 100% will also produce satisfactory amorphous polyesters. The use of the above-described amorphous poly(alkylene terephthalates) in the selectively hydrogenated block copolymer/polycarbonate blends is said to provide compositions which extrude smoothly and are easy to strand, each without excessive die swell. Articles made from these blends may be used at temperatures far above the glass transition temperature of the crystalline polyesters without loss in important properties.

It has now been discovered that new and improved polycarbonate/polyester blend compositions may be prepared which incorporate still another amorphous polyester copolymer. The thermoplastic compositions of this invention form either a single or a two-phase system as evidenced by the fact that they exhibit either one or two glass transition temperatures. The compositions of the subject invention exhibit significantly lower heat distortion temperatures and in addition retain unexpectedly high tensile and flexural strengths and good impact strength over polycarbonate/polyethylene terephthalate blends.

In the past, articles molded from polycarbonates and poly(alkylene terephthalate)/polycarbonate resin blends had high heat distortion temperatures which required very high extrusion and molding temperatures in order to provide sufficient melt flow to the thermoplastic material to completely fill the interstices within molds. At these high molding and extrusion temperatures, degradation of the polymeric material frequently occurs which is often evidenced by discoloration of the material. The degradation of the material also contributes to a loss in impact strength, which is undesirable because high impact strength is one of the more functionally important attributes for shaped thermoplastic articles. The compositions of the present invention exhibit lower heat distortion temperatures, thereby permitting the compositions to be extruded and molded at lower processing temperature with significant reduction in degradation of the materials. Other important physical and mechanical properties of articles shaped from the instant compositions, such as tensile, flexural, and impact strengths are fully retained or improved upon with respect to the heat distortion temperature compositions of the prior art.

SUMMARY OF THE INVENTION

In accordance with the subject invention, new and improved thermoplastic compositions comprise an intimate admixture of:
(a) an aromatic carbonate polymer or copolymer; and
(b) a polyester copolymer derived from
  (i) a glycol portion comprising 1,4-cyclohexanedimethanol and ethylene glycol, wherein the molar ratio of 1,4-cyclohexanedimethanol to ethylene glycol in said glycol portion is from about 4:1 to 1:4; and
  (ii) an acid portion comprising at least one aromatic dicarboxylic acid selected from the group consisting of terephthalic acid, isophthalic acid and mixtures the two.

The compositions of the subject invention form either a single or two phase system which may exhibit one or two glass transition temperatures. The heat distortion temperature of the copolyester component (b) is in the range of from about 60° C. to about 70° C. The copolyesters for use in the subject invention are generally completely miscible in the polycarbonate resin and depending upon whether the cyclohexanedimethanol or the ethylene glycol predominates in the glycol portion, may form blends with polycarbonate which are substantially transparent or semi-transparent to opaque, respectively.

The new and improved thermoplastic compositions of the subject invention have low heat distortion temperatures and may be molded at lower temperatures without deterioration of physical properties. The compositions exhibit unexpectedly high tensile and flexural properties even in blends containing up to roughly 50% of the copolymer. In fact, the tensile and flexural properties of an 80%/20% polycarbonate/copolymer blend unexpectedly are higher than those of either polycarbonate or the copolymer alone. The impact strengths of the subject compositions are generally within the 1-2 ft. lb. range and above, and early indications show good compatability between the subject compositions and known impact modifying additivies, such that impact strength improvements, if desired, may be easily accomplished.

The subject compositions exhibit good physical properties through a wide composition range and generally may comprise from about 98% to 2% by weight aromatic polycarbonate and from about 2 to 98% by weight copolymer, by weight of the overall composition. In preferred embodiments, the subject compositions comprise from about 40% to 80% by weight aromatic polycarbonate and from about 20% to 60% by weight copolymer. The subject compositions may also include impact modifiers, flame retardants, reinforcing agents, fillers, and pigments or the like, if desired.

The compositions described above wherein the glycol portion is predominantly comprised of ethylene glycol generally range in optical properties from opaque to semi-transparent. The opacity of these particular thermoplastic blends of the invention is due exclusively to phases since both polymers are amorphous with transparency reaching a minimum at about 50/50 blends. This opacity tends to limit application of these particular compositions for those uses where transparency is desired or required, such as windows, safety shields and the like. It has been unexpectedly discovered that the addition of a second copolymer comprising cyclohexanedimethylene units and terephthalate and isophthalate units to these particular compositions results in stable ternary blends having substantially transparent optical properties.

In accordance with this embodiment of the invention therefore, a new and improved substantially transparent thermoplastic composition comprises an intimate admixture of:
(a) an aromatic carbonate polymer or copolymer;
(b) a first polyester copolymer derived from
 (i) a glycol portion comprising ethylene glycol and cyclohexanedimethanol wherein the molar ratio of ethylene glycol to cyclohexanedimethanol is from 1:1 to 4:1; and
 (ii) an acid portion comprising at least one aromatic dicarboxylic acid selected from the group consisting of terephthalic acid, isophthalic acid, and mixtures of the two; and
(c) a second polyester copolymer comprising
 (i) cyclohexanedimethylene units; and
 (ii) iso- and terephthalate units.

In preferred embodiments of this aspect of the subject invention, the transparent thermoplastic compositions will comprise from about 40% to 60% by weight aromatic carbonate polymer; from about 10% to about 30% by weight of the first copolymer, and from about 20% to about 50% by weight of the second copolymer, based upon the weight of the overall composition. Compositions comprising about 50% by weight aromatic carbonate polymer, about 20% by weight of the first copolymer, and about 30% by weight of the second copolymer and having a transparency of at least about 80% are especially preferred.

Other objects and advantages of the subject invention will become apparent from the following detailed description of the invention taken in conjunction with the working examples.

DETAILED DESCRIPTION OF THE INVENTION

In accordance with the subject invention, a new and improved thermoplastic composition is provided which comprises:
(a) an aromatic carbonate polymer or copolymer; and
(b) a polyester copolymer derived from
 (i) a glycol portion comprising: 1,4-cyclohexanedimethanol and ethylene glycol, wherein the molar ratio of 1,4-cyclohexanedimethanol to ethylene glycol is from about 1:4 to about 4:1; and
 (ii) an acid portion comprising at least one aromatic dicarboxylic acid selected from the group consisting essentially of terephthalic acid, isophthalic acid and mixtures of the two.

The aromatic polycarbonate component (a) for use in the subject invention has recurring units of the formula:

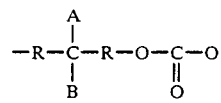

wherein each —R— is selected from the group consisting of phenylene, halo-substituted phenylene and alky-substituted phenylene and A and B are each selected from the group consisting of hydrogen, hydrocarbon radicals free from aliphatic unsaturation and radicals which together with the adjoining

atom form a cycloalkane radical, the total number of carbon atoms in A and B being up to 12.

The aromatic carbonate polymers for use as component (a) are well known, and many suitable resins of this group are disclosed in the Encyclopedia of Polymer Science and Technology, Vol. 10, pages 710–727, 1969, Interscience of New York, and Baron et al., U.S. Pat. No. 4,034,016, both of which are incorporated herein by reference.

The polycarbonate is preferably a high molecular weight polymer having the formula:

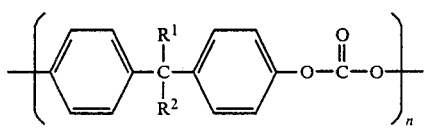

where $R^1$ and $R^2$ are hydrogen, (lower) alkyl or phenyl and n is at least 30, and preferably 40 to 400. The term "(lower) alkyl" includes hydrocarbon groups of from 1–6 carbon atoms.

High molecular weight, thermoplastic aromatic polycarbonates in the sense of the present invention are to be understood as homopolycarbonates and copolycarbonates and mixtures thereof which have a number average molecular weight of about 8,000 to more than 200,000, preferably about 10,000 to 80,000 and an intrinsic viscosity of 0.30 to 1.0 deciliters per gram (dl./g.) as measured in solution in methylene chloride at 25° C. The polycarbonates are derived from dihydric phenols such as, for example, 2,2-bis(4-hydroxyphenyl)propane, bis(4-hydroxyphenyl) methane, 2,2-bis(4-hydroxy-3-methylphenyl) propane, 4,4-bis(4-hydroxyphenyl)heptane, 2,2-(3,5,3′,5-tetrachloro-4,4′-dihydroxyphenyl) propane, 2,2-(3,5,3′5-tetrabromo-4,4′-dihydroxydiphenyl) propane, and (3,3′-dichloro-4,4′-dihydroxydiphenyl) propane, and (3,3′-dichloro-4,4′-dihydroxydiphenyl) methane. Other dihydric phenols for use in the preparation of the above polycarbonates are disclosed in U.S. Pat. Nos. 2,999,835; 3,028,365; 3,334,154 and 4,134,575 incorporated herein by reference.

The polycarbonates can be manufactured by known processes, such as, for example, by reacting a dihydric phenol with a carbonate precursor such as phosgene in accordance with methods set forth in the above-cited literature and in U.S. Pat. Nos. 3,989,672; 4,018,750 and 4,123,436, or by transesterification processes such as are disclosed in U.S. Pat. No. 3,153,008, as well as other processes known to those skilled in the art, all of which are incorporated herein by reference.

The aromatic polycarbonates utilized in the present invention also include the polymeric derivatives of a dihydric phenol, a dicarboxylic acid, and carbonic acid, such as are disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate. Also employable are blends of any of the above materials.

Branched polycarbonates, such as are described in U.S. Pat. No. 4,001,184, can be utilized, as can blends of a linear polycarbonate and a branched polycarbonate.

The preferred polycarbonate resins may be derived from the reaction of bisphenol-A and phosgene. These polycarbonates have from 10–400 recurring units of the formula:

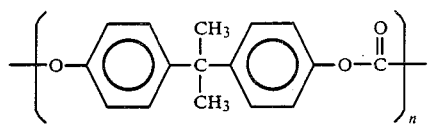

III

The polycarbonate should have an intrinsic viscosity between 0.3 and 1.0 dl./g. preferably from 0.40 to 0.65 dl./g. as measured at 25° C. in methylene chloride or a similar solvent. Because of its ready availability, the ease with which it reacts with phosgene and the very satisfactory properties which it provides in polymerized form, bisphenol-A is preferred as the starting dihydric phenol compound. A suitable bisphenol-A polycarbonate is available under the trademark LEXAN® from General Electric Company.

The polyester copolymer component (b) can, without limitation, comprise the reaction product of a glycol portion comprising 1,4-cyclohexanedimethanol and ethylene glycol, wherein the molar ratio of the 1,4-cyclohexanedimethanol to ethylene glycol in the glycol portion is from about 4:1 to 1:4, with an acid portion comprising terephthalic acid, or isophthalic acid or mixtures of both acids.

The polyester copolymer component (b) may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethyltyerephthalate, together with the dihydric alcohols are charged to a flask and heated to temperatures sufficient to cause condensation of the copolymer to begin, for example to 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as NaH Ti(OC₄H₉)₆ in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters for use as component (b) in the subject invention generally will have an internal viscosity of at least about 0.4 dl./gm as measured in 60/40 phenol/tetrachloroethane or other similar solvent at about 25° C. and will have a heat distortion temperature of from about 60° C. to 70° C. The relative amounts of the 1,4-cyclohexanedimethanol to ethylene glycol in the glycol portion may vary so long as the molar ratio of 1,4-cyclohexanedimethanol to ethylene glycol is from 1:4 to 4:1, in order to provide a polyester copolymer having suitable properties and a heat distortion temperature within the recited range.

It has been discovered that the copolymer (b) should have a heat distortion temperature of between about 60° C. to 70° C. in order to significantly reduce the glass transition temperature and heat distortion temperature of the overall composition to enable less destructive processing and molding temperatures to be employed when forming shaped articles from the subject compositions. Copolymers having heat distortion temperatures within this range are useful if heat distortion temperature depression of polycarbonate is desired, because the addition of small amounts of these copolymers yield large depressions in HDT for the polycarbonate without adversely affecting other desired physical properties.

A preferred copolymer for use as component (b) in the subject invention is a copolyester as described above wherein the glycol portion has a predominance of 1,4-cyclohexanedimethanol over ethylene glycol, e.g. greater than 50/50 mixture and especially preferably is about 65 molar 1,4-cyclohexanedimethanol to 35 molar ethylene glycol and the acid portion is terephthalic acid. When this preferred copolyester is blended with bisphenol-A polycarbonate, the resultant blends are generally completely miscible over a broad range of the components, exhibit a single glass transition temperature indicating the formation of a single phase blend and exhibit tranluncies of greater than 80%. These blends show significant reduction in heat distortion temperature over polycarbonate and in addition retain very high flexural and tensile strength. A commercially available copolyester of this preferred type is KODAR PCTG sold by the Eastman Kodak Company.

Another preferred copolyester for use as component (b) in the subject invention is a copolyester as described above wherein the glycol portion has a predominance of ethylene glycol over 1,4-cyclohexanedimethanol, for example greater than 50/50 and especially preferably is about 70 molar ethylene glycol to 30 molar 1,4-cyclohexanedimethanol and the acid portion is terephthalic acid. When this preferred copolyester is blended with bisphenol-A polycarbonate over broad ranges of the components, compatible two-phase blends are formed which exhibit two glass transition temperatures. These blends likewise display a reduced heat distortion temperature over polycarbonate and also retain high tensile and flexural strength and properties. A preferred copolyester of this type is also commerically available under the tradename KODAR PETG 6763 from Eastman Kodak Company.

In accordance with the subject invention, the new and improved thermoplastic compositions may comprise from about 98% to 2% by weight of aromatic carbonate polymer or copolymer and from about 2% to 98% by weight of polyester copolymer component (b), based upon the weight of the overall composition. The improved characteristics of these compositions are exhibited over a wide range of the components. In those composition described above exhibiting two phases, i.e. those wherein the glycol portion of copolyester component (b) is predominantly ethylene glycol over 1,4-cyclohexanedimethanol, the compositions are generally semi-transparent to opaque. For those applications where transparency and clarity are desired in a shaped thermoplastic article, it has unexpectedly been discovered that said compositions may be rendered substantially transparent by the addition of a second copolymer. In accordance with this embodiment of the subject invention, new and improved substantially transparent thermoplastic compositions comprise:

(a) an aromatic carbonate polymer or copolymer;
(b) a first polyester copolymer derived from
  (i) a glycol portion comprising ethylene glycol and cyclohexanedimethanol wherein the molar ratio of ethylene glycol to cyclohexanedimethanol is from 1:1 to 4:1; and
  (ii) an acid portion comprising terephthalic acid; and
(c) a second polyester copolymer comprising:
  (i) cyclohexanedimethylene units; and
  (ii) iso- and terephthalate units.

The second copolymer component (c) is the reaction product formed by condensing cyclohexanedimethanol and a mixture of isophthalic and terephthalic acids. This second copolymer may be prepared as described above or as described in U.S. Pat. No. 4,188,314 incorporated herein by reference. Generally second copolymer component (c) is formed by condensing 1,4-cyclohexanedimethanol with a mixture of from 10% to 25% by weight isophthalic acid and from 90% to 75% by weight terephthalic acid. A commercially available copolymer for use as the component (c) herein is sold under the tradename KODAR A150 from the Eastman Kodak Company.

The substantially transparent thermoplastic compositions preferably comprise from about 40% to 60% by weight aromatic polycarbonate, from about 10% to 30% by weight of the first copolymer and about 20% to 40% by weight of the second copolymer. Especially preferred are substantially transparent compositions comprising about 50% by weight aromatic carbonate polymer, about 20% by weight of the first copolymer and about 30% by weight of the second copolymer and having a transparency of at least about 80%. The substantially transparent embodiments of the thermoplastic compositions of this invention are useful to form such articles as windows, safety shields and the like for transportation vehicles.

Each of the above-described embodiments of this invention display good tensile and flexural strengths and reduced glass transition and heat distortion temperatures over polycarbonates or polycarbonate/polyethylene terephthalate blends.

In preferred embodiments each of the above-described compositions will additionally include an impact modifying agent to further exploit the improved processability of the subject compositions and to provide thermoplastic compositions which may be molded or shaped into articles possessing enhanced impact strength. Many impact modifiers for polyesters are presently known in the art and by way of illustration useful impact modifiers for the present thermoplastic compositions may include a selectively hydrogenated linear radial or teleblock copolymer of vinyl aromatic compounds (A) and $(A')_n$ and an olefinic elastomer (B) of the A—BA',; A—(BAB)$_n$—A; A(BA)$_n$B; (A)$_4$B; B(A)$_4$; or B((AB)$_n$B)$_4$ type, wherein n is an integer from 1 to 10. Typically, the vinyl aromatic compounds A and A' are selected from styrene, alpha-methylstyrene, vinyl toluene, vinyl xylene, vinyl napthalene and especially styrene. The olefinic elastomer B is usually derived from butadiene, isoprene, 1,3-pentadiene 2,3-dimethylbutadiene and the like and may have a linear, sequential or teleradial structure. The selectively hydrogenated block copolymer impact modifiers are now well-known in the art and illustrative commercially available products are the Kraton G series from Shell Chemical Company, Polymers Division, and especially Kraton G 1651.

Another useful impact modifying agent for use in the subject compositions are the various polyacrylate resins known in the art. For example, suitable polyacrylates can be made in known ways, but are abundantly commerically available from many sources, e.g., Rohm & Haas Chemical Company, Philadelphia, Pa. under the trade desigantions Acryloid KM 330, and 7709 XP; Goodyear Tire & Rubber Company, Akron, Ohio under the trade designation RXL 6886; from American Cyanamid Company, Stamford, CT., under the trade designation Cyanacryl 770; from M&T Chemicals Co., Trenton, NJ, under the trade designation Durostrength 200; and from Polysar Corporation, Canada, under the trade designation Polysar S1006. In general any of the polyalkyl acrylates described by Brinkman et al., U.S. Pat. No. 3,591,659 can be used, especially those containing units derived from n-butyl acrylate. Preferably, the polyacrylate will comprise a multiple stage polymer having a rubbery first stage and a thermoplastic hard final stage as described in Farnham et al., U.S. Pat. No. 4,096,202 incorporated herein by reference. It has also been found advantageous to add both polyalkyl acrylate and an acrylate-based core-shell polymer such as Acryloid KM-330 above-mentioned.

The impact modifiers may be added to the subject compositions in conventional amounts of from 0.01% to 50% by weight based on the weight of the overall composition and usually in amounts of from 0.01% to 10% by weight on the same basis.

In many applications for these new and improved thermoplastic compositions it may be desirable that they be substantially flame retardant. Known flame retardant agents may be added to accomplish this purpose and generally the useful flame retardant agents comprise compounds containing bromine, chlorine, antimony, nitrogen and mixtures of any of the foregoing. More particularly, the flame retardant additive comprises a halogenated organic compound (brominated or chlorinated); a halogen-containing organic compound in admixture with an organic or inorganic antimony compound, e.g., antimony oxide, or a mixture of any two or more of the foregoing. Particularly useful flame retardant additives are the copolycarbonates which are the product of a halogenated bisphenol-A and a dihydric phenol, prepared in accordance with U.S. Pat. No. 3,334,154, incorporated herein by reference, such as a tetrabromobisphenol-A/bisphenol-A copolycarbonate which is particularly preferred.

Illustrative of the halogen-containing compounds useful in the practice of this aspect of the invention are the chlorinated and/or brominated aromatics and diaromatics such as disclosed in U.S. Pat. No. 4,020,124, including: 2,2-bis(3,5-dichlorophenyl)propane, bis(2,6-dibromophenyl) methane, tetrabromobenzene, hexachlorobenzene, hexabromobenzene, decabromobiphenyl, etc. Also encompassed within the scope of this invention are the phthalimide flame retardants, for example, those derived from alkanes such as methane, ethane, propane, butane and the like, containing one, two or more halogenated phthalimide groups, and preferably a dipthalimide.

Synergistic agents may also be added in amounts generally less than three parts by weight of the overall compositions, with special mention being made of antimony oxide.

The subject compositions may, as has already been mentioned, also include other additives. For example, pigments, such as titanium dioxide, and foaming agents, such as 5-phenyltetrazole, may be added. The compositions of the invention may be reinforced with reinforcing amounts of reinforcing agents, such as powders, whiskers, fibers or platelets of metals, e.g., aluminum, bronze, iron or nickel, and nonmetals, e.g., carbon filaments, acicular $CaSiO_3$, asbestos, $TiO_2$titanate whiskers, glass flakes, glass fibers, and the like. Such reinforcements need only be present in reinforcing amounts and generally from 1 to 60 parts by weight, preferably 5 to 40 parts by weight, of the total composition will comprise reinforcing agent. The compositions may also contain stabilizers, such as phosphites, phosphates, epoxides, and the like, either individually or in combination, depending on the end use. It has been discovered that although high temperatures are not required for processing the compositions of the subject invention, in instances where high mixing, extrusion or molding temperatures are employed or desired, for example temperatures above 575° F., some discoloration and therefore degradation may occur, which can be substantially reduced by inclusion of a stabilizer and generally phosphite stabilizers are preferred. Also other known impact modifiers such as the Solprenes available from Phillips Petroleum Co. may be added or incorporated herein.

The compositions of the subject invention are prepared by methods well known in the art. In general, the aromatic polycarbonate resin and the copolymer, together with the second copolymer (if used) flame retardant agents, foaming agents, reinforcing agents, pigments and/or stabilizers are blended in an extruder and are then extruded to form pellets. The lower heat distortion temperature and glass transition temperatures of the compositions of the subject invention permits blending of the components in the extruder at temperatures of from about 425° to 550° F. as compared to temperatures of from about 500° to 600° F. currently employed when blending polycarbonates or polycarbonate/polyethylene terephthalate blends. The extruded pellets are then injection molded in a well-known manner in conventional injection molding machines at temperatures of about 42° to 550° F., as compared with conventional polycarbonate molding temperatures of about 470° to 550° F. to form articles of desired shape and size. The subject compositions and more particularly articles molded therefrom exhibit good tensile, flexural and impact strengths and the undesirable effects of degradation of the materials caused by higher molding and processing temperatures, such as discoloration and loss in impact strength, ate agreeably reduced.

The following working examples are provided to better illustrate the subject invention and its properties to those skilled the art. In the Examples, all parts and percentages are by weight unless otherwise specified.

EXAMPLE 1

The following thermoplastic composition illustrates a non-solution blend of polycarbonate and poly(ethylene-co-1,4-cyclohexanedimethylene-terephthalate).

A thermoplastic composition was prepared as follows:

41.3 grams of bisphenol-A polycarbonate (LEXAN®141 from General Electric Company) and 13.7 grams of poly((0.7) ethylene-co-(0.3)-1,4-cyclohexanedimethylene-terephthalate) were dried in a forced air oven at 235° F. for a 24 hour period. The dried components were then charged into a Haake Rheocord mixing bowl and compounded for 5 minutes at 300° C. melt temperature. The resultant blend was compression molded at 525° F. into ASTM D256 test specimens ⅛" thick.

The blend had two glass transition temperatures at 83° C. and 130° C. corresponding to the copolyester and polycarbonate respectively. The test specimens had a notched Izod impact strength of 1.6 ft.-lbs/in.

EXAMPLE 2

The following compositions were prepared by blending in a single screw Killion extruder at 525° F. and were extruded to form molding pellets The pellets were then dried at 212° F. for 2 hours. The pellets were then injection molded in a ⅜oz. Newbury injection molding machine at 525° F. to form standard ASTM D638 tensile bars, ASTM D256 Izod impact parts and ASTM heat distortion temperature test specimens of ⅛" inch thickness. The test specimens were evaluated under the above-identified standard methods for heat distortion temperature, tensile strength, flexural strength and flexural modulus. The compositions and the test results obtained are shown in Table 1.

TABLE 1

| EXAMPLE | 1A* | 2 | 1B** |
|---|---|---|---|
| bisphenol-A polycarbonate[1] | 100% | 80% | 0% |
| poly((0.7)-ethylene-co-(0.3)-1,4-cyclohexanedimethylene terephthalate)[2] | 0% | 20% | 100% |
| PROPERTIES | | | |
| heat distortion temperature, °C. | 128 | 110 | 65 |
| tensile strength, kpsi | 8.8 | 9.0 | 6.9 |
| flexural strength, kpsi | 14.4 | 14.9 | 11.4 |
| flexural modulus, kpsi | 348 | 365 | 308 |

[1]Lexan 141, General Electric Company.
[2]KODAR PETG 6763, Eastman Kodak Co.
*Control - no copolyester added
**Control - no polycarbonate added As illustrated in Table 1, blends of bisphenol A-polycarbonate and poly(0.7)-ethylene-co-(0.3)-1,4-cyclohexanedimethylene terephthalate) copolymer unexpectedly exhibit higher tensile and flexural properties than either polycarobnate or copolymer alone.

EXAMPLES 3-6

The following examples illustrate the physical properties of blends of bisphenol-A plycarbonate and poly ((0.7)-ethylene-co-(0.3)-1,4-cyclohexanedimethyleneterephthalate) over a broad composition range. Each of the examples exhibited two glass transition temperatures and were semi-transparent to opague.

TABLE 2

| EXAMPLES | 3A* | 3 | 4 | 5 | 6 | 6A** |
|---|---|---|---|---|---|---|
| Compositions | | | | | | |
| Lexan ® 141 | 100% | 80% | 60% | 40% | 20% | 0% |
| Kodar PETG 6763 | 0% | 20% | 40% | 60% | 80% | 100% |
| Properties | | | | | | |
| Transparency, % | 89 | 67 | 49 | 50 | 55 | 85 |
| Haze | 3 | 29 | 54 | 9 | 93 | 17 |
| YI | 4 | 21 | 20 | 16 | 16 | 6 |
| Glass transition temperature, °C. | 149 | 80/ 136 | 81/ 135 | 81/ 135 | 81/ 139 | 80 |
| Heat distortion temperature, °C. | 128 | 110 | 101 | 79 | 60 | 65 |
| Tensile strength | | | | | | |
| strength at yield, kpsi | 8.8 | 9.0 | 8.5 | 8.0 | 7.2 | 6.9 |
| % elongation at break, % | 7 | 35 | 73 | 128 | 151 | 176 |
| Flexural strength | | | | | | |
| modulus, kpsi | 348 | 365 | 358 | 340 | 325 | 308 |
| strength, kpsi | 14.4 | 14.9 | 14.0 | 13.0 | 11.8 | 11.4 |
| Notched Izod, ft.lbs./in | 1.3-16.2 | 1.2 | 1.6 | 1.3 | 1.2 | 0.8 |

*Control - no copolyester added
**Control - no polycarbonate added

The above examples illustraste the effective reduction of heat distortion temperature in the blends in accordance with the subject invention with excellent retention of good tensile and flexural properties and impact strength.

EXAMPLES 7-10

The following illustrates the properties of bisphenol-A polycarbonate/poly((0.65)-1,4-cyclohexane-dimethylene-co-(0.35)-ethyleneterephthalate) blends over a wide composition range. The following thermoplastic compositions exhibit one glass transition temperature, are completely miscible, and are transparent.

| EXAMPLES | 7A* | 7 | 8 | 9 | 10 | 10A* |
|---|---|---|---|---|---|---|
| Compositions | | | | | | |
| LEXAN ® 141 | 100% | 80% | 60% | 40% | 20% | 0% |
| Poly((0.65)-1,4-cyclohexanedimethylene-co-(0.35)-ethylene terephthalate)[1] | 0% | 20% | 40% | 60% | 80% | 100% |
| Properties | | | | | | |
| transparency, % | 89.0 | 89.2 | 88.7 | 87.8 | 87.4 | 87.7 |
| glass transition temp., °C. | 149 | 134 | 119 | 107 | 95 | 85 |
| heat distortion temp., °C. | 128 | 110 | 100 | 87 | 77 | 62 |
| tensile strength, kpsi | 8.8 | 9.0 | 8.8 | 8.2 | 8.8 | 6.2 |
| flexural strength, kpsi | 14.4 | 12.8 | 12.4 | 11.4 | 10.4 | 8.8 |
| flexural modulus, kpsi | 348 | 319 | 310 | 287 | 255 | 240 |
| notched Izod Impact, ft. lbs/in. | 16.2 | 18.3/ 2.6 | 19.6/ 2.4 | 21.9/ .57 | 23.6/ 1.4 | 26.9/ .81 |
| ductility, % | 100% | 80% | 70% | 80% | 40% | 80% |

[1]KODAR PCTG, available from Eastman Kodak Company.
*Control.

EXAMPLE 11

The following illustrates the unexpected improvements in transparency for the subject compositions as described in Examples 3-6 wherein the glycol portion of the copolyester is predominantly ethylene glycol, by the addition of a second copolymer comprised of 1,4-cyclohexanedimethylene units, terephthalate units and isophthalate units.

The semi-transparent to opaque optical properties of the bisphenol-A polycarbonate/poly((0.7)-poly-ethylene-co-(0.3)1,4-cyclohexanedimethylene terephthalate) blends of the subject invention are illustrated by the % transparency measurements reported in Examples 3-6.

| EXAMPLE | 14 |
|---|---|
| Composition (parts by weight) | |
| LEXAN ® 141 | 50 |
| KODAR ® PETG 6763 | 20 |
| poly(1,4-cyclohexanedimethylene-terephthalate-co-isophthalate)[1] | 30 |

[1]KODAR A 150, available from Eastman Kodak Company.

The above composition was compounded by extrusion and molded into test plaques. The compositions had a heat distortion temperature of 94° C. and a transparency of 80%.

EXAMPLES 12-22

The following illustrates the improvement in impact strength for the compositions of this invention imparted by the addition of a polyacrylate coreshell copolymer.

The following compositions were prepared from the following components:

| EXAMPLES | 12 | 13 | 14 | 15 | 16 | 17 | 18 | 19 | 20 | 21 | 22 |
|---|---|---|---|---|---|---|---|---|---|---|---|
| Compositions | | | | | | | | | | | |

-continued

| EXAMPLES | 12 | 13 | 14 | 15 | 16 | 17 | 18 | 19 | 20 | 21 | 22 |
|---|---|---|---|---|---|---|---|---|---|---|---|
| (parts by weight) | | | | | | | | | | | |
| bisphenol-A polycarbonate[1] | 50 | 78 | 70 | 58 | 68 | 60 | 74 | 54 | 64 | 69 | 59 |
| KODAR PETG 6763 | 40 | 20 | 20 | 40 | 30 | 30 | 20 | 40 | 30 | 25 | 35 |
| core-shell polymer[2] 40/60 methyl/n-butyl acrylate | 10 | 2 | 10 | 2 | 2 | 10 | 6 | 6 | 6 | 6 | 6 |
| phosphite stabilizer | .1 | .1 | .1 | .1 | .1 | .1 | .1 | .1 | .1 | .1 | .1 |
| Properties | | | | | | | | | | | |
| Notched Izod impact strength, ft-lbs./in | | | | | | | | | | | |
| $\frac{1}{4}''$ | 13.4 | low | 12.8 | 1.6 | 1.9 | 12.4 | 12.0 | 3.8 | 13.2 | 13.0 | 3.8 |
| $\frac{1}{8}''$ | 16.0 | 16.8 | 14.9 | 2.5/16.9 | 17.1 | 15.3 | 15.7 | 17.2 | 16.4 | 16.3 | 16.8 |
| Heat distortion temp. °C. at 264 psi | 86.3 | 111.1 | 107.9 | 97.9 | 104.8 | 97.8 | 106.4 | 91.9 | 100.7 | 105.0 | 92.9 |

[1]LEXAN ® ML 4403111, General Electric Company
[2]Acryloid KM 330, Rohm & Haas Chemical Company For each of the above examples, the KODAR PETG 6763 copolyester was dried overnight in a forced air oven at 70° C. Thereafter the copolyester was coated with the phosphite stabilizer and the coated copolyester was extruded on a $\frac{3}{4}''$ Killion extruder at 450° F. into pellets. The KODAR PETG 6763/stabilizer was dried overnight at 70° C. The polycarbonate and Acryloid KM 330 were dried in a forced air oven at 120° C. for a period of about 4 hours. Thereafter, the Kodar PETG 6763/stabilizer, polycarbonate, and Acryloid KM 330 were dry blended then extruded on a $\frac{3}{4}''$ Killion at 500° F. melt temperature. ASTM test parts were molded on a 32 oz. Newberry at 500° F. set temperature and the evaluated properties are set forth in the table.

The results illustrate that the compositions of the subject invention are compatible with impact strength modifiers which when incorporated into the subject compositions effectively enhance the impact strength of articles molded therefrom.

EXAMPLES 23-24

Identical compositions to that shown by Example 20. above, were prepared with the exception that in one of the compositions the phosphite stabilizers was omitted. Test specimens of each composition were molded at various temperatures to evaluate processing temperature tolerance and latitude for the compositions of the invention. The test specimens were evaluated for notched Izod impact strength, heat distortion temperature and yellowness index (YI) and the following results were obtained:

| EXAMPLES | 23 | 24 |
|---|---|---|
| Compositions (parts by weight) | | |
| LEXAN ® ML4403111 | 64 | 64 |
| KODAR PETG 6763 | 30 | 30 |
| ACRYLOID KM 330 | 6 | 6 |
| phosphite stabilizer | — | 0.1 |
| PROPERTIES | | |
| at molding temp. 525° F. | | |
| $\frac{1}{8}''$ Notched Izod | 16.4 | 16.0 |

-continued

| EXAMPLES | 23 | 24 |
|---|---|---|
| Impact strength ft-lbs/in. | | |
| HDTUL °C., at 264 psi | 99.1 | 102.7 |
| YI | 15.9 | — |
| at molding temp. 550° F. | | |
| $\frac{1}{8}''$ Notched Izod, ft.-lbs/in. | 15.8 | 15.7 |
| HDTUL, °C. at 264 psi | 99.4 | 99.5 |
| YI | 14.4 | 13.2 |
| at molding temp. 575° F. | | |
| $\frac{1}{8}''$ Notched Izod, ft.-lbs/in | 15.4 | 15.3 |
| HDTUL, °C. at 264 psi | 97.6 | 100.8 |
| YI | 34.7 | 15.6 |
| at molding temp. 600° F. | | |
| $\frac{1}{8}''$ Notched Izod, ft.-lbs./in | 15.0 | 13.7 |
| HDTUL, °C. at 264 psi | 97.3 | 97.5 |
| YI | 42.0 | 15.9 |

Both blends possess excellent retention of impact strength and heat distortion temperature over the range of molding tempeatures. The blend without phosphite stabilizer, Example 24 yellowed significantly at 575° F. and higher. As a result the incorporation of phosphite stabilizer is recommended for high temperature processing and molding applications.

For purposes of these Examples the test specimens were not molded at temperatures lower than 525° F. However, at 525° F. the above compositions flowed easily indicating that even lower processing temperatures can be used. The considered estimate for processing latitude of this invention is 525°±100° F.

EXAMPLES 25-34

The following examples illustrate compatability of the subject compositions with other impact modifying additives and illustrate certain flame retardant embodiments of the invention.

The following compositions were prepared and tested in accordance with the procedures described above. In addition, the flame retardancy of some of the compositions was evaluated in accordance with Underwriters Laboratories Test Bulletin UL-94. The following results were obtained:

| EXAMPLES | 25 | 26 | 27 | 28 | 29 | 30 | 31 | 32 | 33 | 34 |
|---|---|---|---|---|---|---|---|---|---|---|
| Compositions (parts by weight) | | | | | | | | | | |
| LEXAN ® 141 | 77 | 76 | 75 | 77 | 76 | 75 | 35 | 37 | 36 | 35 |
| KODAR PETG 6763 | 20 | 20 | 20 | 20 | 20 | 20 | 20 | 20 | 20 | 20 |

-continued

| EXAMPLES | 25 | 26 | 27 | 28 | 29 | 30 | 31 | 32 | 33 | 34 |
|---|---|---|---|---|---|---|---|---|---|---|
| ACRYLOID KM 330 | 2 | 2.7 | 3.4 | — | — | — | 3.4 | — | — | — |
| Ethylene ethylacrylate copolymer | 1 | 1.3 | 1.6 | — | — | — | 1.6 | — | — | — |
| selective hydrogenated styrene-butadiene-styrene block copolymer[1] | — | — | — | 3 | 4 | 5 | — | 3 | 4 | 5 |
| tetrabromobisphenol-A/bisphenol-A copolycarbonate (50% tetrabromobisphenol-A) | — | — | — | — | — | — | 40 | 40 | 40 | 40 |
| Properties | | | | | | | | | | |
| HDTUL, °C. at 264 psi | 107 | 110 | 114 | 111 | 117 | 109 | 116 | 119 | 124 | 125 |
| Notched Izod, ft.-lbs/in | | | | | | | | | | |
| ¼" | 15.3 | 15.3 | 15.7 | 16.1 | 15.4 | 15.6 | 11.2 | 2.2 | 3.2 | 4.6 |
| ⅛" | 3.4 | 3.5 | 12.2 | 2.8 | 5.7 | 14.3 | — | — | — | — |
| Tensile strength at yield, kpsi | — | 8.8 | 8.5 | — | 8.6 | 8.4 | 8.9 | — | — | 9.1 |
| Tensile modulus, kpsi | — | 323 | 331 | — | 329 | 304 | 314 | — | — | 313 |
| elongation at break, % | — | 22 | 61 | — | 82 | 25 | 38 | — | — | 66 |
| Flexural strength, kpsi | — | 13.8 | 13.4 | — | 13.8 | 13.2 | 14.2 | — | — | 14.3 |
| Flexural modulus, kpsi | — | 344 | 327 | — | 337 | 333 | 343 | — | — | 343 |
| UL 94 Flammability, ⅛" | — | — | — | — | — | — | VO | VO | VO | VO |

[1]Kraton G 1651, Shell Chemical Company.

These data show that the subject compositions can be effectively impact modified by incorporation of a selectively hydrogenated styrene-butadiene-styrene block copolymer impact modifier Examples 28, 29, and 30 and by a combination of impact modifiers such as Acryloid KM 330 and ethylene ethyl acrylate oopour as and by Examples 25, 26 and 27. In addition, the subject compositions may be rendered flame retardant by addition of an effective amount of a halogenated organic compound in the form of a tetrabromobisphenol-A/bisphenol-A copolycarbonate.

The subject invention provides new and improved thermoplastic compositions having lower heat distortion temperatures which exhibit full retention of impact strength and improved tensile and flexural strength over polycarbonates alone.

All of the foregoing patents and applications are specifically incorporated herein by reference. Although the subject invention has been described in terms of particular preferred embodiments, it is apparent that modifications or changes may be made therein by those skilled in the art. For example, any relative molar ratios of 1,4-cyclohexanedimethanol to ethylene glycol may be present in the glycol portion of the copolyester component (b) so long as it is within the range of 1:4 to 4:1. Moreover, when isophthalic acid was substituted in whole or in part for the terephthalic acid in the acid portion of copolyester component (b), substantially the same results were obtained, e.g. heat distortion temperature was reduced and impact strength, tensile and flexural strength were retained. Further, instead of 1,4-cyclohexanedimethanol, ethylene glycol, terephthalic acid and isophthalic acid, as well as bisphenol-A and phosgene, obvious chemical equivalents may be used to prepare the resinous components of the present compositions. All such changes or modifications may be made without departing from the scope and spirit of the subject invention as defined by the appended claims.

What is claimed is:

1. A thermoplastic composition comprising:
   (a) 2-98% by weight of an aromatic carbonate polymer or copolymer;
   (b) 2-98% by weight of a polymer copolymer derived from a
      (i) a glycol portion comprising 1,4-cyclohexanedimethanol and ethylene glycol wherein the molar ratio of 1,4-cyclohexane-dimethanol to ehtylene glycol is from about 1:1 to 4:1, and
      (ii) an acid portion comprising an aromatic dicarboxylic acid selected from the group consisting essentially of terephthalic acid, isophthalic acid and mixtures of the two acids.

2. A thermoplastic compsition as defined in claim 1, wherein the aromatic carbonate is a carbonate of bisphenol-A.

3. A thermoplastic composition as defined in claim 2 wherein the polyester copolymer has an acid portion which consists essentially of terephthalic acid.

4. A thermoplastic composition as defined in claim 2, wherein the polyester copolymer has an acid portion which consists essentially of isophthalic acid.

5. A thermoplastic composition as defined in claim 2, wherein the polyester coplymer has an acid portion which consists essentially of mixture of terephthalic acid and isophthalic acid.

* * * * *